United States Patent [19]

Moser et al.

[11] 4,188,820

[45] Feb. 19, 1980

[54] DEVICE FOR MEASURING ROTATIONAL ANGLES OF A ROTATING SHAFT

[75] Inventors: Werner Moser; Peter Mantsch, both of Graz, Austria

[73] Assignee: Hans List, Graz, Austria

[21] Appl. No.: 922,215

[22] Filed: Jul. 5, 1978

[30] Foreign Application Priority Data

Jul. 15, 1977 [AT] Austria ................................ 5143/77

[51] Int. Cl.² .......................................... G01M 15/00
[52] U.S. Cl. ..................................................... 73/116
[58] Field of Search ............... 73/462, 35, 116, 119 A; 324/178–180, 16 T

[56] References Cited

U.S. PATENT DOCUMENTS

| | | |
|---|---|---|
| 3,753,082 | 8/1973 | Crawford et al. ................ 324/16 T |
| 3,753,108 | 8/1973 | Eberle .............................. 324/16 T |
| 4,052,663 | 10/1977 | Lindsey ............................ 324/16 T |
| 4,070,613 | 1/1978 | Brady ............................... 324/16 T |

*Primary Examiner*—Jerry W. Myracle
*Attorney, Agent, or Firm*—Watson, Cole, Grindle & Watson

[57] ABSTRACT

A device for measuring rotational angles of a rotating shaft of a machine, and comprising transducers signals of which being released by one or several reference angle signs or a machine characteristic phenomenon respectively, and being input to a processing unit. The processing unit comprises a frequency multiplier circuit and a counter the frequency multiplier circuit multiplying the signal of one or several reference angle signs, with the counter counting the multiplied signals and being resettable and startable by either a reference angle signal or the signal released by the machine characteristic phenomenon and being blockable by the respective other signal.

3 Claims, 8 Drawing Figures

DEVICE FOR MEASURING ROTATIONAL ANGLES OF A ROTATING SHAFT

BACKGROUND OF THE INVENTION

This invention relates to a device for measuring rotational angles of a rotating shaft of a machine between a defined reference angle position of the shaft and an angle position at the instant of occurrence of a phenomenon caused by the function of the machine reference angle position being defined by a sign applied on the shaft, device comprising transducers, the signals of which are released by one or several reference angle signs or the machine characteristic phenomenon respectively, and being input to a processing unit which transforms the gate signal defined by the time interval between a reference angle signal and the machine characteristic signal into a signal proportional to the rotational angle.

DESCRIPTION OF THE PRIOR ART

A known method to transform the gate signal into a signal proportional to the rotational angle of a shaft is to provide a transducer device on the shaft which produces the number of k·360 impulses at each revolution of the shaft, "k" being a factor defining the desired resolution, and to count the impulses produced by the transducer device during the gate signal time. This method has the disadvantage that the transducer devices are relatively large and their attachment or mounting is often impossible or very difficult. Moreover, such transducers are expensive and subject to wear and they enable only a limited resolution.

SUMMARY OF THE INVENTION

It is an object of this invention to provide a device of the kind referred to by which the mentioned disadvantages can be avoided. Therefore according to the invention the processing unit comprises a frequency multiplier circuit and a counter, the frequency multiplier circuit multiplying the signal of one or several reference angle signs by the factor $\alpha \cdot k$, whereby "$\alpha$" is the angle between two subsequent reference angle signs, and "k" being a constant defining the angle resolving the counter counts the multiplied signals and is resettable and startable by either a reference angle signal (A) or the signal (A') released by the machine characteristic phenomenon and being blockable by the respective other signal (A,A').

Attachment of an impulse transducer is not necessary. The whole device can be built up by electronic components which are not subject to wear and take little space.

According to the invention it is further proposed that the frequency multiplier circuit comprises a voltage controlled oscillator controlled by the output voltage of a filter connected to the output of a phase comparator, the filter being connected to a frequency dividing circuit which reduces by the factor $\alpha \cdot k$ the frequency of the oscillator, the signals of which are transmitted to the counter, the output signals (B) of the frequency dividing circuit and the reference angle signal (A) being both input to the phase comparator. In this arrangement the output signals of the voltage controlled oscillator are supplied to the frequency dividing circuit and also to the counter which counts the impulses during the gate signal time as already mentioned.

When especially high measuring accuracy is demanded it is very advantageous to provide an arrangement in which the frequency dividing circuit consists of an auxiliary counter and a decoder after the auxiliary counter, the counter being resettable by an edge of a signal released by a second reference angle sign (E) the decoder generating an impulse to the phase comparator when the auxiliary counter has reached a count of $\alpha \cdot k$, the angle "$\alpha$" between the two subsequent reference angle signs being preferably 120 degrees.

These means enable the frequency of the voltage controlled oscillator—the signals of which are counted during gate signal time by the counter and the reading of which reached during this time is a measure for the rotational angle of the shaft—to be determined by the phase comparator and the filter by that speed of the shaft being present when the shaft sweeps over the angle between the two reference angle signs.

Reference angle sign (E) preceded reference angle sign (A) by an amount of degrees corresponding to the expected maximal measured value. The provision of reference angle sign (E) as near as possible before reference angle sign (A) enables minimization of errors in measurement caused by nonuniform rotation of the shaft, e.g. of an internal combustion engine, and the linearity of the frequency multiplier circuit.

According to the invention it is further provided that one of the inputs of the phase comparator and the control input of the auxiliary counter are connected to the output of a logic circuit consisting of an exclusive OR gate, the inputs of the logic circuit being connected to the output (M) of a J—K Flip-Flop which is controlled by an impulse (L) supplied by a transducer sensing the reference angle signs and to the output of an integrating circuit, which is also connected to the output of the Flip-Flop, whereby the phase comparator processes one of the edges and the auxiliary counter the other edge of the impulse present at the output (Q) of the logic circuit. This enables use of one single transducer for both reference angle signs due to the possibility gained by the above measures to identify the reference angle signs.

DESCRIPTION OF THE DRAWINGS

The invention will be hereinafter more specifically described with reference to some exemplary embodiments depicted in the accompanying drawings, wherein.

DESCRIPTION OF THE PREFERRED EMBODIMENTS

Figure 1:
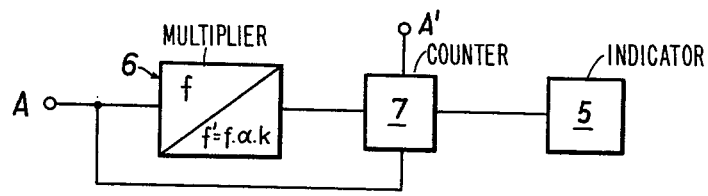
FIGS. 1,2,4, and 6 show different embodiments of the invention.
Figure 3:
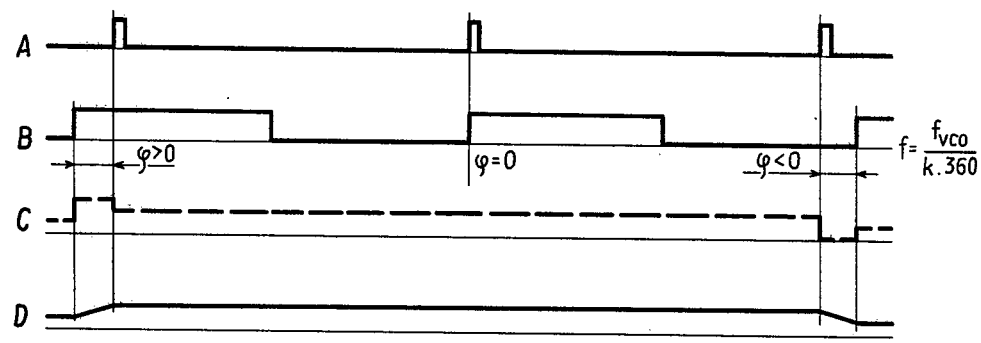
FIGS. 3,5,7, and 8 show the signals at various points of the circuit for the embodiments according to FIGS. 2,4, and 6.
Figure 2:
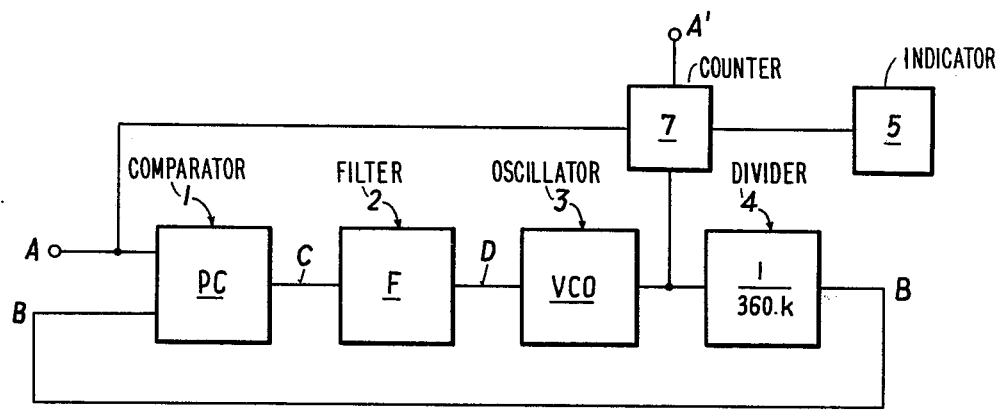

The simplest embodiment of the invention is shown in FIG. 1. Signal A, supplied by a transducer (not shown) sensing the reference sign on a shaft, is input to frequency multiplier circuit 6 which multiplies signal A arriving once per revolution of the shaft by the factor 360·k, "k" determining the angle resolution. The output of frequency multiplier circuit 6 is connected to counter 7 which is resettable and startable by signal A and blockable by signal A', released by a machine characteristic phenomenon. The counter reading reached during the gate signal time, defined by the arrival of signals A and A', is a measure of the rotational angle of the shaft covered during the gate signal time, and is indicated either directly or inverted to angle degrees by means of an indicating instrument 5. FIG. 2 shows one possible embodiment of the frequency multiplier circuit.

Signals A of the reference angle sign, and signals B reduced in frequency by factor 360·k, "k" again determining the desired angle resolution, by means of frequency dividing circuit 4 are input to phase comparator 1. The output C of phase comparator 1 is connected to filter 2. The frequency of the voltage controlled oscillator 3 is readjusted by the output voltage D of filter 2 until the phase shift between reference angle signal A and the reduced signal B is zero or a minimum. So the oscillator frequency represents an impulse frequency of the reference angle sign multiplied by the factor 360·k. The signals attained from oscillator 3 are counted by counter 7 during gate signal time. Contrary to the embodiment of FIG. 1, in the embodiment of FIG. 2 the frequency of oscillator 3 is practically defined only by the average speed of the shaft at one revolution due to the synchronization of signals A and B by phase comparator 1 and filter 2. This enables high accuracy of measurement also during acceleration conditions of the machine.

Figure 4:
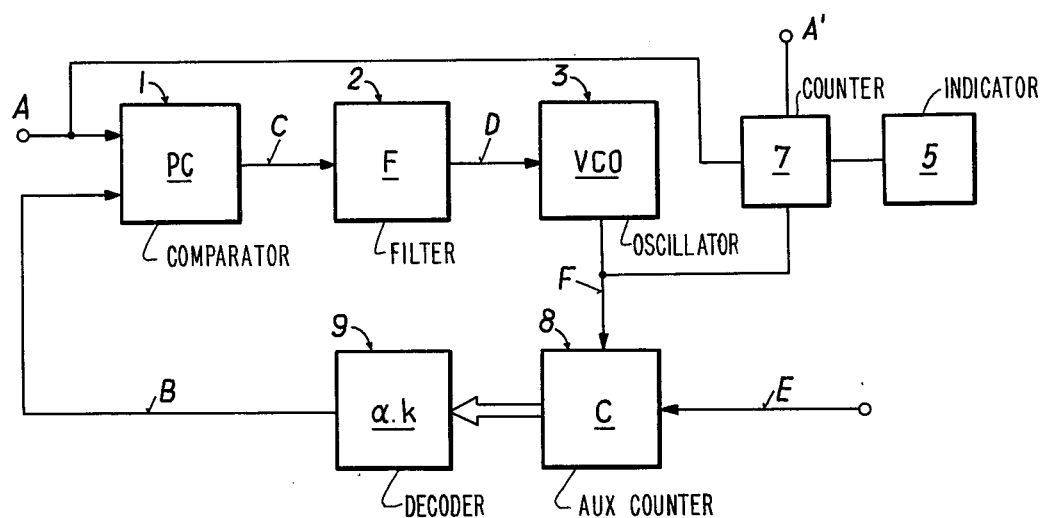

The embodiment according to FIG. 4 enables the fulfillment of especially high demands for measurement accuracy also with strong nonuniformity of the angular velocity of the shaft. In this case provision of a second reference angle sign E at the shaft before the proper reference angle sign A is necessary.

The essential difference between the embodiment of FIG. 4 and that of FIG. 2 is that frequency divider circuit 4 is replaced by auxiliary counter 8 and decoder 9. Auxiliary counter 8 is resettable by a signal released by reference angle sign E. Decoder 9 gives a signal B when counter reading α·k is reached, "α" defining the angle between reference angle sign E and reference angle sign A, "k" defining the angle resolution. Signal B is lead to phase comparator 1 or in the embodiment of FIG. 2.

Figure 5:
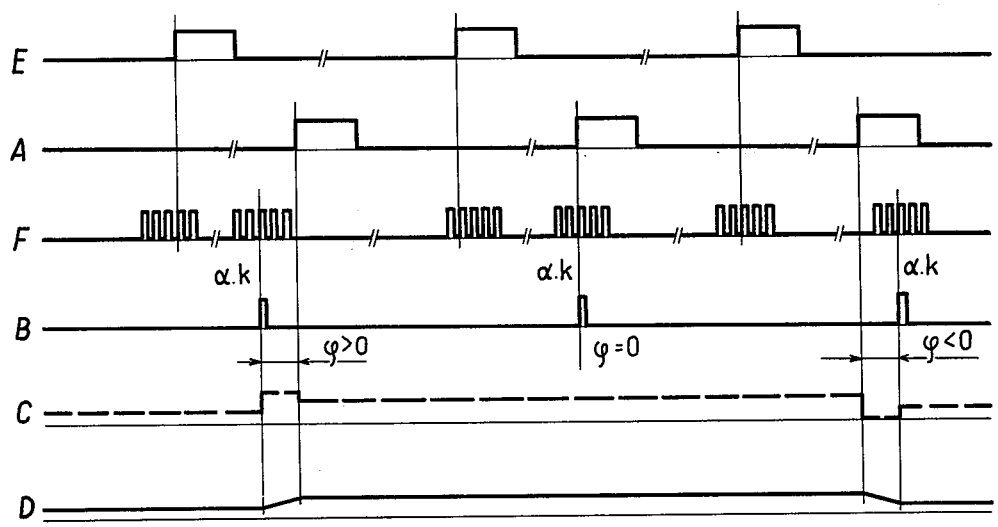

From FIG. 5 it can be seen that by means of phase comparator 1 and filter 2 signals A and B are synchronized so that the frequency of oscillator 3 corresponds to the frequency of the arriving reference angle signals A multiplied by the factor 360·k because auxiliary counter 8 starts counting not until reference angle sign E is reached and decoder 9 gives signal B when the counter reading is α·k. Due to the fact that in this embodiment the frequency of oscillator 3 is practically defined only by the revolution speed of the shaft when passing the range immediately before the proper measuring range, that is the angle "α" between reference angle signs E and A, high measuring accuracy is obtained even with a great nonuniformity of the angular velocity of the shaft at one revolution. The synchronization of signals A and B is an indirect measurement of the velocity of the shaft in the range of angle "α" whereby forming of an average velocity value over a total revolution is avoided.

Figure 6:
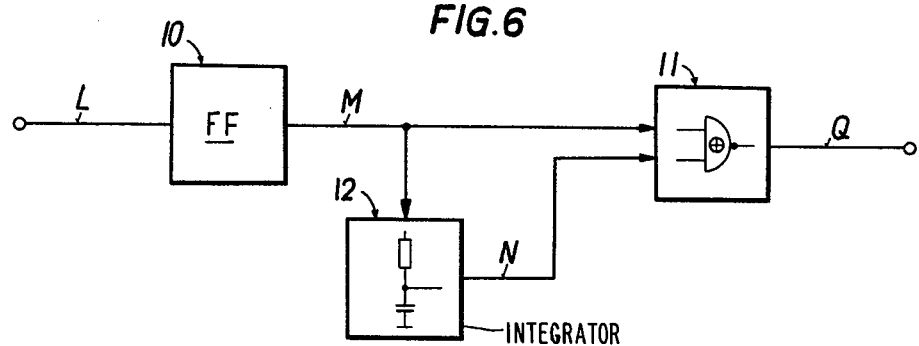

In the embodiment according to FIG. 4 it is not necessary to use two transducers for sensing reference angle signs A and E when interposing an identifier circuit at one of the inputs of phase comparator 1 and the control input of auxiliary counter 8. Such an arrangement is shown in FIG. 6. It consists of a J—K Flip-Flop 10 controlled by impulses L released from the transducer sensing the reference angle signs, an integrating member 12 connected to the output of Flip-Flop 10, and a logic circuit 11 formed as an exclusive OR gate the inputs of which are connected to the output of Flip-Flop 10 and the output of integrating member 12. The output Q of logic circuit 11 may be connected to one of the inputs of phase comparator 1 and to the control input of auxiliary counter 8, phase comparator 1 thereby processing one of the edges and auxiliary counter 8 the other edge of the impulses being present at the output Q.

Figure 7:
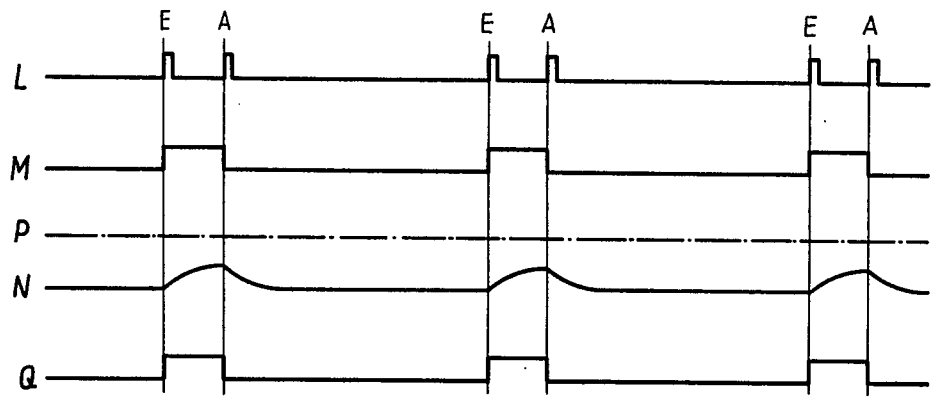
Figure 8:
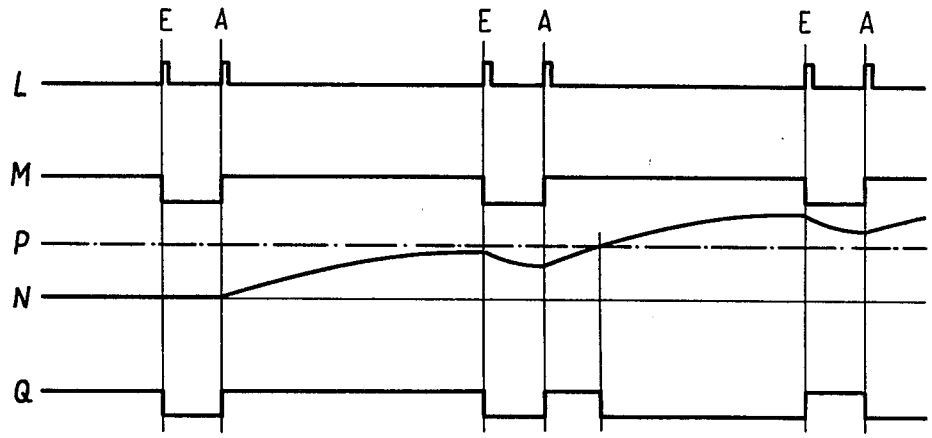

Switching of J—K Flip-Flop 10 to a HIGH-level is caused by chance by one of the reference angle signs E (FIG. 7) or A (FIG. 8). In the case of FIG. 7 the output voltage N of integrating member 12 never reaches the HIGH-level for the subordinate logic circuit 11 so that the impulse present at the output Q of the logic circuit 11 is identical with the impulse present at the output M of J—K Flip-Flop 10.

In the case of FIG. 8 the output voltage N of the integrating circuit reaches after several revolutions HIGH-level P for the subordinate logic circuit 11 so that at its output Q the inverted signal M results. In both cases described above after a certain time the positive edge of the output Q of the logic circuit 11 is identical with reference angle sign E and the negative edge is identical with reference sign A.

We claim:

1. Apparatus for measuring angular rotation of a shaft between a reference position and an angular position removed therefrom, comprising:
   a voltage-controlled oscillator for generating an output having a frequency dependent upon the angle between said reference position and a second reference position;
   means for counting the oscillations in the output signal from said voltage-controlled oscillator and initiating counting upon receipt of a signal with detection of said reference position and terminating counting upon receipt of a signal associated with the angular rotation being measured; and
   means for controlling said voltage-controlled oscillator and including a phase comparator having a first input responsive to a signal representing the count in said means for counting and a second input responsive to the output from said voltage divider, and means responsive to the output of said phase comparator for generating an analog signal controlling said voltage-controlled oscillator.

2. Apparatus according to claim 1 wherein said frequency dividing circuit includes an auxiliary counter and a decoder responsive to said auxiliary counter, said auxiliary counter being resettable by a signal generated by detection of said second reference position, said decoder generating an impulse to said phase comparator when the auxiliary counter has reached a predetermined count 3. Apparatus according to claim 2, further comprising a logic circuit including an exclusive OR gate, a flip-flop circuit, and a transducer for sensing said reference position and said second reference position and generating signals respectively indicative thereof for controlling said flip-flop circuit, an integrating circuit connected to the output of said flip-flop circuit, and wherein one of the inputs of said phase comparator and the control input of said auxiliary counter being connected to the output of said logic circuit whereby the phase comparator processes one of the edges and the auxiliary counter the other edge of the impulse present at the output of said logic circuit.

* * * * *